(12) United States Patent
Kawano et al.

(10) Patent No.: US 7,049,925 B2
(45) Date of Patent: May 23, 2006

(54) LINEAR ACTUATOR

(75) Inventors: Shinichiro Kawano, Osaka (JP); Hiroshi Ueda, Hyogo (JP); Mikio Hirano, Osaka (JP); Masami Wada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 10/380,895

(22) PCT Filed: Sep. 26, 2001

(86) PCT No.: PCT/JP01/08409

§ 371 (c)(1),
(2), (4) Date: Aug. 7, 2003

(87) PCT Pub. No.: WO02/27898

PCT Pub. Date: Apr. 4, 2002

(65) Prior Publication Data

US 2004/0025325 A1    Feb. 12, 2004

(30) Foreign Application Priority Data

Sep. 26, 2000  (JP) ............................ 2000-292051
Oct. 20, 2000  (JP) ............................ 2000-320614
Oct. 30, 2000  (JP) ............................ 2000-330242

(51) Int. Cl.
*H01F 27/24* (2006.01)
(52) U.S. Cl. .................................................. 336/234
(58) Field of Classification Search ................ 336/178, 336/212, 233–234; 310/216–217, 12–39
See application file for complete search history.

(56) References Cited

U.S. PATENT DOCUMENTS

| 2,962,679 | A | * | 11/1960 | Stratton ....................... 336/83 |
| 5,886,435 | A |   | 3/1999  | Dymond |
| 5,924,186 | A |   | 7/1999  | Nakagawa et al. |
| 5,945,748 | A | * | 8/1999  | Park et al. ..................... 310/12 |
| 6,133,669 | A | * | 10/2000 | Tupper ......................... 310/263 |
| 6,246,142 | B1 | * | 6/2001 | Asao et al. .................. 310/217 |
| 6,787,942 | B1 | * | 9/2004 | Lilie et al. .................... 310/12 |
| 6,828,711 | B1 | * | 12/2004 | Lilie ........................... 310/254 |

FOREIGN PATENT DOCUMENTS

| DE | 3137391 A1 * | 6/1994 |
| JP | 08-98473     | 4/1996 |
| JP | 11-18376     | 1/1999 |
| JP | 11-187620    | 7/1999 |

OTHER PUBLICATIONS

English translation of Japanese International Search Report for PCT/JP01/08409, dated Nov. 27, 2001.

* cited by examiner

*Primary Examiner*—Tuyen T Nguyen
(74) *Attorney, Agent, or Firm*—RatnerPrestia

(57) ABSTRACT

Plural magnetic sheets (22) are laminated in circumference direction to form a cylindrical laminated core. Magnetic sheets (22) adjacent to each other have coupling point (25) at an upper section or a lower section and gap (26) on an opposite side of coupling point (25). Coupling point (25) is prepared at upper section (23), then lower section (24), and upper section (23) then lower section (24) alternately. This structure allows assembling a radial laminated core with ease.

28 Claims, 14 Drawing Sheets

(a)

(b)

(a)

(b)

LINEAR ACTUATOR

TECHNICAL FIELD

The present invention relates to laminated cores that can be applied to electromagnetic apparatuses such as linear actuators, linear dynamos, and electromagnetic valves.

BACKGROUND ART

A conventional linear actuator shown in FIG. 26 is hereinafter described. This linear actuator comprises the following elements:

inner yoke 10, namely, a laminated core formed of numbers of E-shaped magnetic plates 8 punched out from thin steel plate by a die and the E-shaped sheet being arranged in a cylindrical shape radiating around a center axis;

coil 2 wound on slot 1 of inner yoke 10;

outer yoke 3 formed of numbers of I-shaped magnetic sheets punched out from rectangular thin steel plate punched by a die, and the I-shaped sheets being arranged in a cylindrical shape radiating around the center axis;

permanent magnets 5 and 6 disposed in a gap between inner yoke 10 and outer yoke 3; and vibrator 7 for supporting permanent magnets 5 and 6.

Permanent magnets 5 and 6 are magnetized in radial direction, and the magnetic poles of those magnets are arranged such that the inner yoke side of magnet 5 is N pole and the inner yoke side of magnet 6 is S pole. The magnetic poles so arranged, i.e., opposite poles of each magnet, are fixed to vibrator 7.

In the linear actuator structured above, electric current flowing through coil 2 generates magnetic flux that forms magnetic paths indicated with arrow marks. Changing a direction of the electric current changes a direction of the magnetic flux flowing from coil 2, and magnets 5, 6 repeat attraction and repulsion responsive to the change of the magnetic flux. As a result, magnets 5 and 6 reciprocate along the axial direction.

The conventional linear actuator, however, has the following problems:

(1) Since the conventional laminated cores described above are laminated cylindrically, each magnetic sheet should be thicker at the outer side of the core and thinner at the inner side of the core. A magnetic sheet available in the market; however, is constant in thickness across the sheet, thus each one of the magnetic sheets seems to be cut for changing the thickness to be assembled into the conventional laminated cores. This method is not fit to volume production, or cannot keep the thickness uniform throughout all the magnetic sheets. Thus it is difficult to form a cylindrical shape with the conventional magnetic sheets.

(2) Although it is not shown in the drawings, even if a laminated core is produced with magnetic sheets having a uniform thickness across the sheet, the adjacent sheets are contact with each other at inner side. However, they have gaps between at outer side, and bonding such as applying varnish between the sheets and supporting members is required. As a result, the cost increases substantially. Since this laminated core is a radial laminated body, the magnetic sheets radiate from a center, so that the gap becomes wider toward the outer rim. Thus the total iron amount of the inner yoke, i.e., space factor, lowers, and it is difficult for the magnetic flux to travel from the permanent magnets to the thin steel plate.

(3) In the case of a conventional C-shaped or E-shaped core, the magnetic flux generated from the coil travels along the vibrating direction on the inner wall side and radial direction on the opposite side to the permanent magnet. More efficient usage of the magnetic flux needs to employ electrical steel sheet of which magnetic property tends to feed magnetic flux in one direction. This oriented electrical steel sheet tends to feed the magnetic flux in the rolling direction, in fact the magnetic property lowers along right angles with respect to the rolling direction. Therefore, in the case of using the steel plate punched out by a die into C-shaped or E-shaped cores, either one of a vibrating direction or a radial direction is to use a magnetic property having a lower permeability along right angles with respect to the rolling direction. The magnetic flux generated from the coil thus cannot be efficiently used.

DISCLOSURE OF INVENTION

The present invention provides a cylindrical core that is formed by laminating plural magnetic sheets in circumference direction. Adjacent magnetic sheets share a coupler provided at either an upper or a lower section on the outer rim of the laminated core, and gaps are provided to another side of the couplers. The couplers are provided to an upper section, then at a lower section, an upper section, then a lower section alternately. This structure allows assembling a radial laminated core with ease.

The present invention provides a cylindrical core that is formed by laminating plural magnetic sheets in circumference direction, and a coupler extending from an end of the magnetic sheet couplers adjacent magnetic sheets together. This structure allows assembling a laminated core with ease.

The present invention provides a cylindrical core that is formed by laminating plural magnetic sheets in circumference direction, and the core can be divided in axial direction, so that a coil can be mounted with ease.

The present invention provides a cylindrical core that is formed by laminating plural magnetic sheets in circumference direction, and gaps are formed on adjacent sheets at the outer rim side. The core is molded with resin compound including magnetic powder, thereby strengthening the laminated core.

The present invention provides a cylindrical core that is formed by laminating plural magnetic sheets in circumference direction. The core is formed of a radial laminated body formed by laminating the magnetic sheets in circumference direction and an axial laminated body formed by laminating the magnetic sheets in axial direction. This structure allows assembling the laminated core with ease.

The present invention provides a cylindrical core that is formed by laminating plural magnetic sheets in radial direction, and both the ends of the cylindrical shape are bent outward. This structure allows assembling the laminated core with ease.

BEST MODE FOR CARRYING OUT THE INVENTION

Exemplary embodiments of the present invention are demonstrated hereinafter with reference to the accompanying drawings.

Exemplary Embodiment 1

Figure 1:
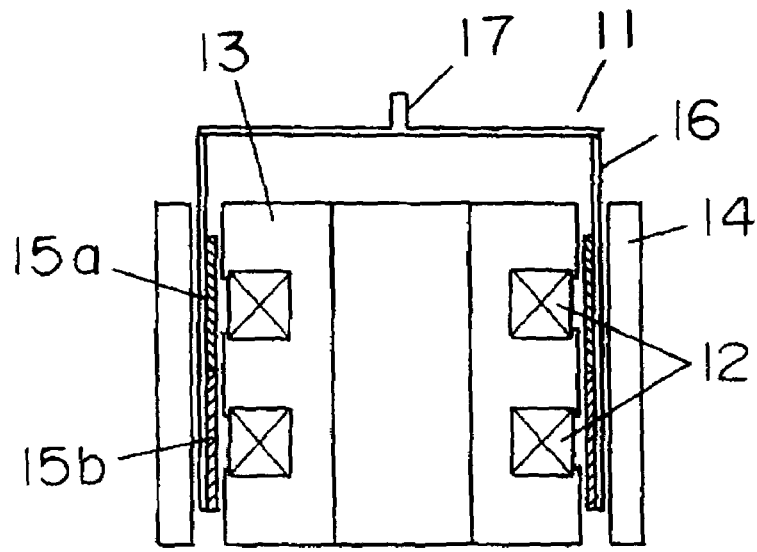
FIG. 1 is a sectional view of a linear actuator in accordance with a first exemplary embodiment.

FIG. 1 shows a structure of linear actuator 11 which comprises the following elements:
cylindrical inner yoke 13;
coil 12 wound on inner yoke 13;
outer yoke 14 disposed outside inner yoke 13;
permanent magnets 15a, 15b which vibrate following the magnetic flux generated by coil 12, magnets 15a, 15b being disposed in a space between inner yoke 13 and outer yoke 14; and
cylindrical vibrator 16 for supporting permanent magnets 15a, 15b.

Magnets 15a, 15b are fixed on vibrator 16 at its side face facing inner yoke 13. Vibrator 16 has output section 17 at an end for outputting the vibration. Output section 17 is shaped like a lid of cylindrical vibrator 16. A resonant spring is mounted to an outputting shaft of output section 17, and a use of resonance of the spring saves power necessary for vibration, so that driving current running through coil 12 can be reduced.

Figure 4:
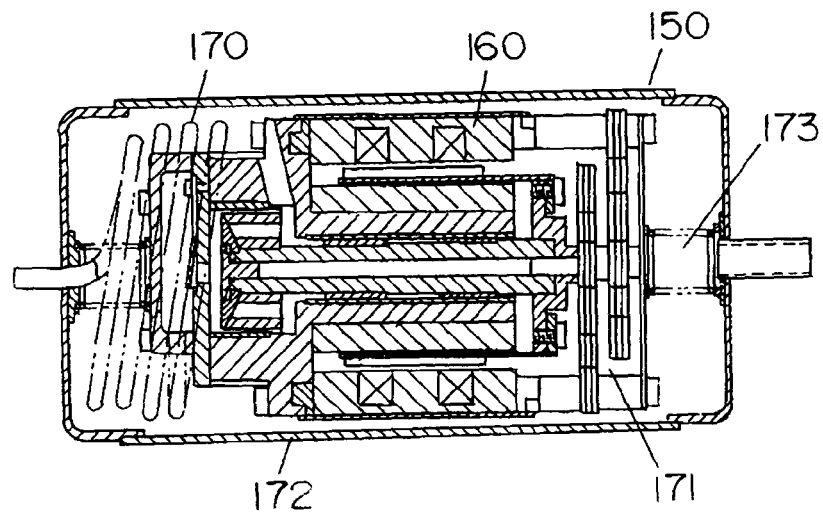
FIG. 4 is a sectional view of a compressor.

An integration of the linear actuator discussed above into a compressor shown in FIG. 4 allows highly efficient driving. Linear compressor 150 comprises the following elements: linear actuator 160, exhausting mechanism 170, spring 171, closed container 172, and supporter 173. This compressor is fit to an air-conditioner.

This linear actuator is detailed hereinafter. Inner yoke 13 is formed by laminating rectangular electrical steel sheet, each one of the plates having two recesses, in circumference direction, thereby forming a cylindrical shape. A ring-shaped groove is provided outside of inner yoke 13, and a winding is wound on this ring-shaped groove, so that coil 12 is formed.

Outer yoke 14 is formed by laminating rectangular electrical steel sheets in circumference direction, thereby forming a cylindrical shape. Inner yoke 13 is disposed inside outer yoke 14. The outer wall of inner yoke 13 runs parallel to outer yoke 14, and they form a uniform space in between.

Ring-shaped permanent magnets 15a, 15b are fixed to an inner wall of vibrator 16 by bonding or press-fitting. The magnetic fluxes of magnets 15a, 15b travel along a radial direction of inner yoke 13, and adjacent magnets 15a, 15b have different poles from each other. The magnetic flux of magnet 15a travels from inner yoke 13 to outer yoke 14, and that of magnet 15b travels from outer yoke 14 to inner yoke 13.

The linear actuator structured above allows vibrator 16 to vibrate by changing the current running through coil 12. The current running through coil 12 allows outer yoke 14 and inner yoke 13 to form a magnetic loop, which causes magnetic flux to appear in the space. Magnet 15 approaches the magnetic flux. Switching a direction of the current inverses the magnetic flux traveling in the space, and magnet 15 moves responsive to the magnetic flux. The switch of the current direction thus vibrates vibrator 16.

Figure 2:
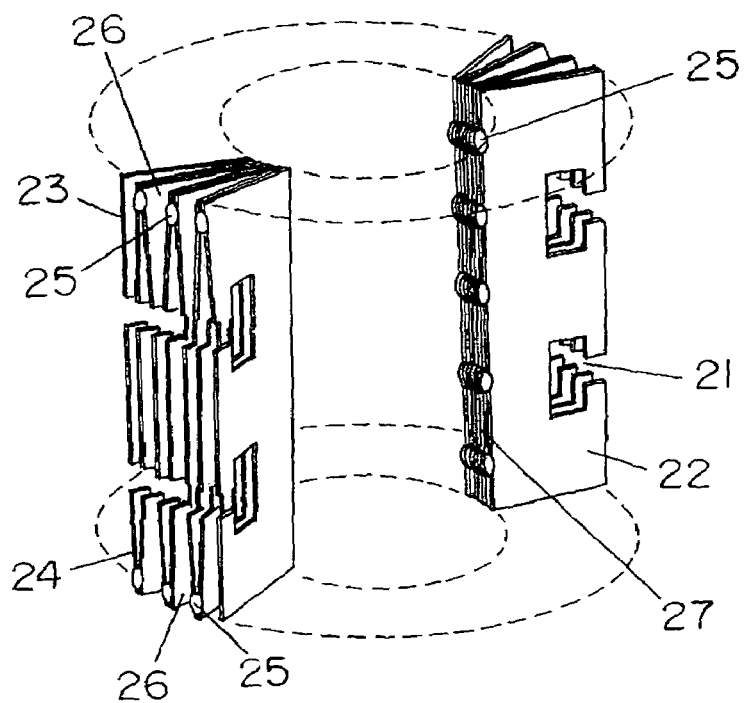
FIG. 2 shows the interior of an inner yoke in accordance with the first exemplary embodiment.

The first embodiment features that adjacent magnetic sheets, made of electrical steel sheet, are welded in zigzag pattern, thereby coupling the adjacent magnetic sheets like a V-letter to form inner yoke 13. FIG. 2 shows a laminated core of which adjacent magnetic sheets form like a V-letter. This laminated core does not show a cylindrical shape in the drawing because of being simplified for easier description, and actually the magnetic sheets are laminated cylindrically. The core shown in FIG. 2 is detailed hereinafter.

Inner yoke 13 is formed by laminating rectangular magnetic sheets 22 in circumference direction. Each one of the sheets has a uniform thickness across the sheet. Magnetic sheets 22 adjacent to each other are welded at either one of upper section 23 or lower section 24 on the outer side, thereby forming coupling point 25, and another side of coupling point 25 is naturally gapped. Gaps 26 are prepared at an upper section, then at a lower section, and an upper section, then a lower section alternately to form zigzag pattern in the circumference direction such that the coupling points are provided to a lower section, then an upper section, and a lower section, then an upper section alternately. This structure is a feature of inner yoke 13.

To be more specific, coupling point 25 is provided to only either one of an upper section or a lower section of magnetic sheets 22 adjacent to each other, and this structure allows the adjacent magnetic sheets 22 to be folded in V-letter when sheets 22 are laminated. When coupling point 25 of the V-letter is located at upper section 23, the next V-letter of magnetic sheets 22 has coupling point 25 at lower section 24. As such, the magnetic sheets folded in V-letter are laminated in circumference direction.

On inner side-face 27 of inner yoke 13, coupling point 25 is prepared at an upper, middle and lower sections simultaneously for coupling adjacent magnetic sheets, so that the adjacent magnetic sheets are coupled together at inner side-face 27 of inner yoke 13. Around the coupling points, adjacent sheets are overlaid each other; however, they are not necessarily overlaid but can be always spaced from each other at constant intervals using the coupling point.

Figure 3:
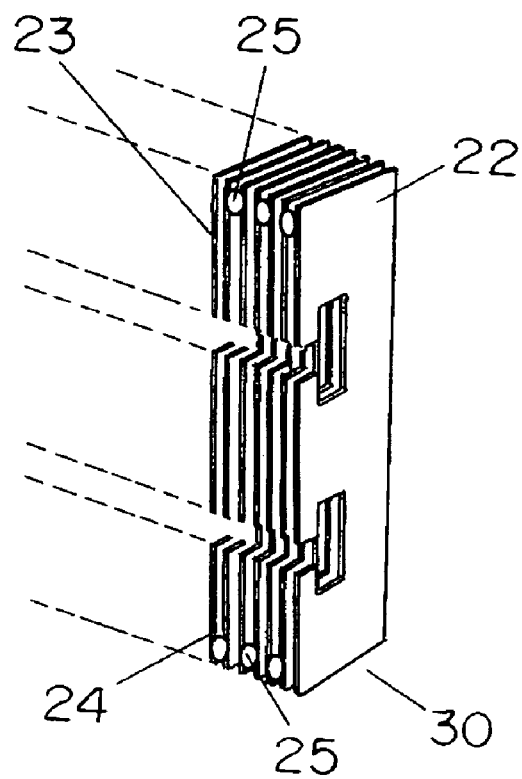
FIG. 3(a) shows a laminated block viewed from outer rim in accordance with the first embodiment.
FIG. 3(b) shows the laminated block viewed from interior in accordance with the first embodiment.
Figure 3:
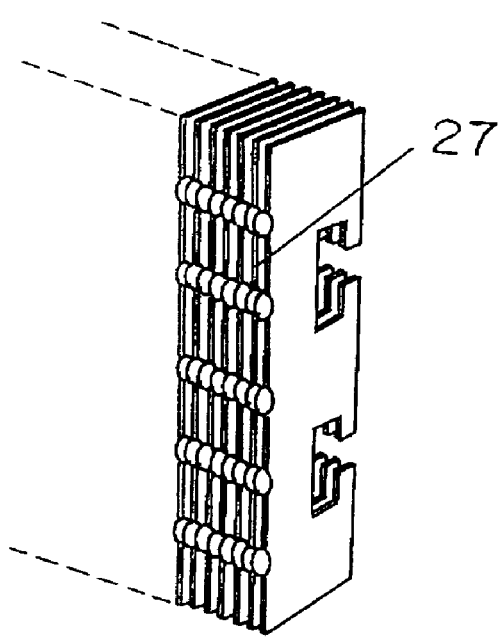

A method of manufacturing the foregoing laminated core is described with reference to FIG. 3. First, laminate plural magnetic sheets 22 side by side to form a row, then prepare a coupling point by welding at an end face of outer side of the magnetic sheet which is a part of outer wall of the laminated core. Coupling points 25 are welded at upper section 23, then lower section 24, and upper section 23 then lower section 24 alternately like zigzag pattern. If coupling point 25 is prepared at upper section 23 on the end face of outer side of adjacent magnetic sheets 22, no coupling point is prepared at lower section 24 on the same adjacent sheets, so that the adjacent sheets can be spaced out at the lower section. Similarly, if coupling point 25 is prepared at lower section 24 on the end face of outer side of adjacent magnetic sheets, no coupling point is prepared at upper section 23 on the same adjacent sheets, so that the adjacent sheets can be spaced out at the upper section.

On inner side of the laminated core, i.e., on inner side face of magnetic sheet 22, coupling points 25 are provided to an upper, middle and lower sections for coupling an adjacent sheet to the sheet itself. All the magnetic sheets adjacent to each other are coupled together only at the inner side, and the principal faces of magnetic sheets 22 are not integrated by welding.

As discussed above, plural magnetic sheets are welded to form laminated block 30, then the outer side of block 30 is stretched out with respect to inner side 27 as a center side, so that block 30 is turned into a cylindrical laminated core. Since inner side faces 27 are coupled together, an inner rim length stay the same even the laminated block is stretched out. However, an outer rim length increases due to the stretching, because adjacent sheets are spaced out where no coupling points 25 are available, for they are not completely coupled together.

In other words, since the outer rim length changes, when the inner side of laminated block 30 is shaped like a cylinder, the outer side is stretched along the laminating direction, so that block 30 turns into a cylindrical laminated core. At this time, the outer rim of block 30 is extending with the interval between the adjacent sheets being widened. However, the adjacent sheets 22 positively have coupling point 25 either at upper section 23 or lower section 24, so that the vicinity of coupling point 25 will not open against the stretching along the laminating direction.

Coupling point 25 positively couplers parts of each outer side end-face of adjacent magnetic sheets, so that the stretch of laminating block 30 distributes force uniformly to every magnetic sheet. This uniform force stretches respective sheets, so that gaps 26 formed by the respective adjacent sheets are opening at even angles, and magnetic sheets 22 are laminated in circumference direction at even intervals.

Without the coupling points on the outer side end-face of laminated block 30, an effort for making the block cylindrical would be fruitless. Because the outer side formed of the magnetic sheets is not stretched by an even force, so that the magnetic sheets cannot be laminated at even intervals in the circumference direction.

The foregoing method of manufacturing the laminated core refers to the inner yoke of a linear actuator; however, the method is not limited to the inner yoke, but can be applied to the outer yoke. As long as a laminated core is formed by laminating magnetic sheets in circumference direction, the method can be applied to electromagnetic valves, transformers, and electromagnetic induction heating appliances. The coupling point is not necessarily welded but it can be caulked.

Exemplary Embodiment 2

Figure 5:
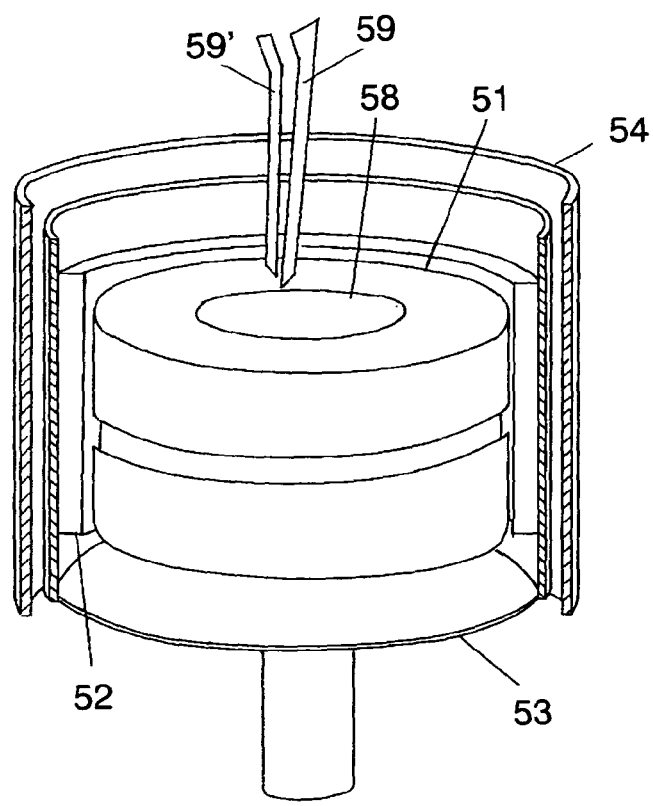
FIG. 5 is a partial sectional view of a linear actuator in accordance with a second exemplary embodiment.
Figure 6:
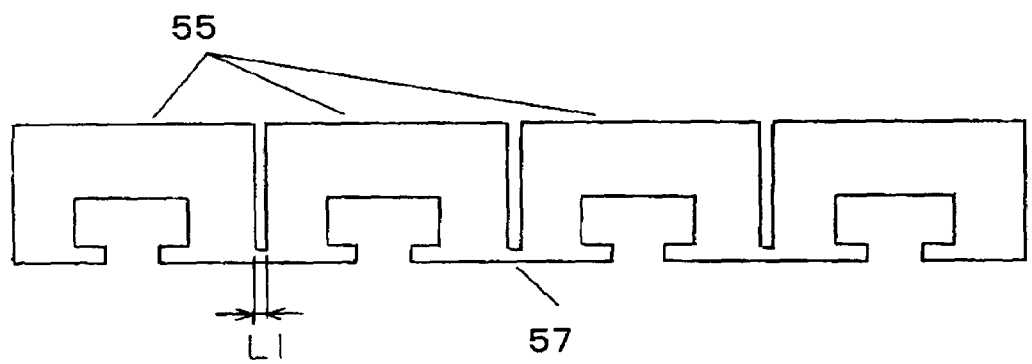
FIG. 6 illustrates a magnetic sheet in accordance with the second exemplary embodiment.

As shown in FIG. 5, the second exemplary embodiment provides a laminated core that includes inner yoke 51 having one coil, vibrator 53 being disposed outside inner yoke 41 and having permanent magnet 52, and outer yoke 54 disposed outside of vibrator 53. As shown in FIG. 6, each one of magnetic sheets 55 has one slot 56, and sheets 55 adjacent to each other are coupled by coupler 57.

Figure 7:
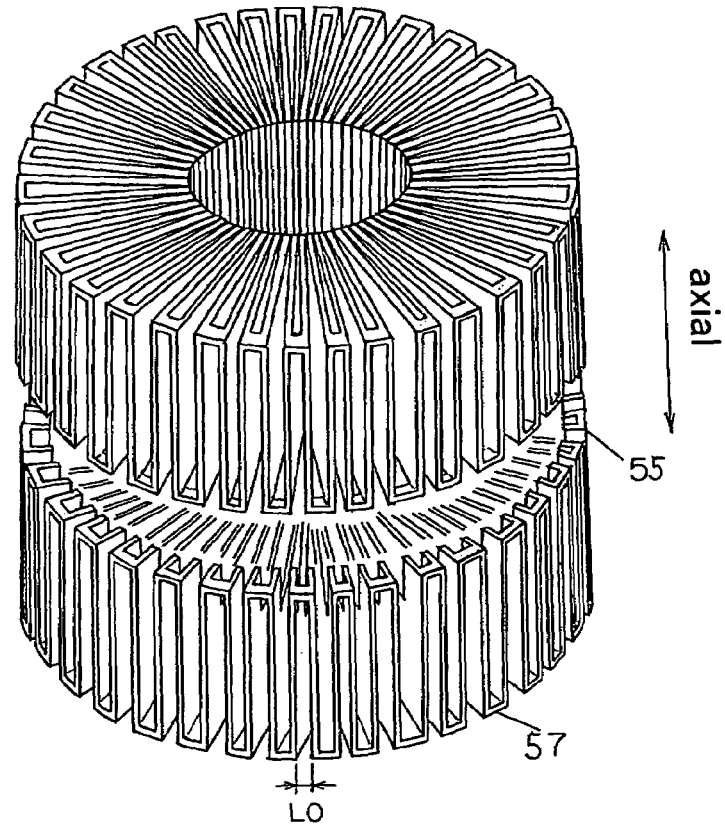
FIG. 7 illustrates a laminated core in accordance with the second embodiment.

Magnetic sheets 55 thus coupled are folded at coupler 57 over adjacent sheet 55 so that sheets 55 are laminated radially as shown in FIG. 7. Then the inner wall of the laminated iron core is welded at two sections, i.e., an upper section and a lower section, such that the adjacent magnetic sheets on the circumference are integrated, thereby assembling inner yoke 51.

At this time, length L1 of coupler 57 shown in FIG. 6 is desirably equal to interval length L0 between laminated magnetic sheets 55. Lead wires 59 and 59' are provided to inner yoke 51 as electric coupling means for feeding the coil with power.

Figure 8:
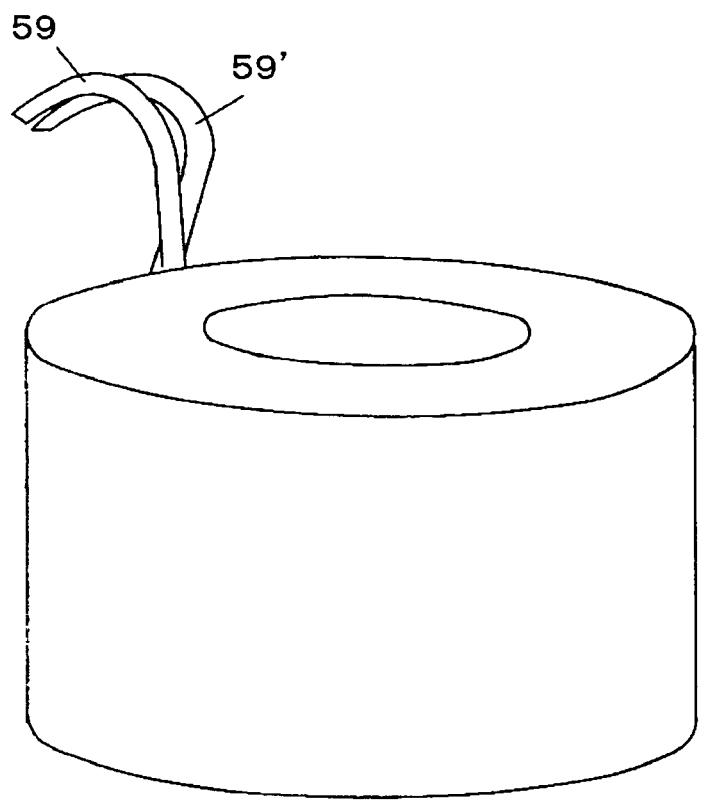
FIG. 8 shows an inner yoke molded in accordance with the second embodiment.

Inner yoke 51 shown in FIG. 7 is a laminated core, and it can be strengthened by molding, which uses resin compound including iron powder of 65 volume %, to be more specific, thermoset polyester resin is used. (FIG. 8 shows a molded inner yoke.) Another molding method is to fill gaps of inner yoke 51 and spaces of slots, where coils are wound, with resin compound, so that it seems as if a complete stator is integrated into one independent body. The iron powder included in the resin compound preferably undergoes oxide film treatment so that the powder surface is covered with oxide film.

The resin compound having iron powder improves magnetic property, which results in improving motor's efficiency by 2%. This improvement is proportionate to the volume % of the iron powder in the resin compound. In other words, the motor efficiency improves greater as the content of iron powder increases; however, moldability of the resin compound lowers, so that the content of iron powder is practically max. 80 volume %. The content not more than 50 volume % does not improve the magnetic property. Thus an appropriate iron-powder content ranges from 50 to 80%.

Figure 9:
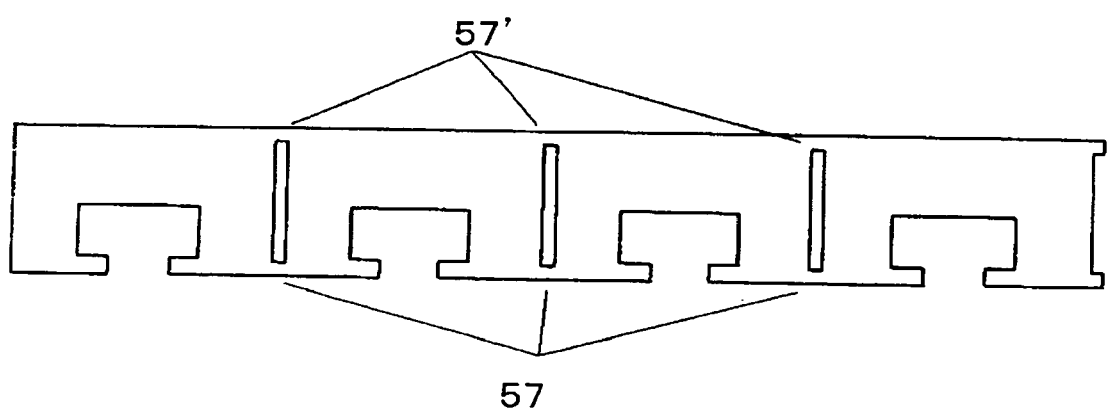
FIG. 9 shows a magnetic sheet having two couplers.

As shown in FIG. 9, coupler 57 can be prepared at two places on magnetic sheets adjacent to each other.

Figure 10:
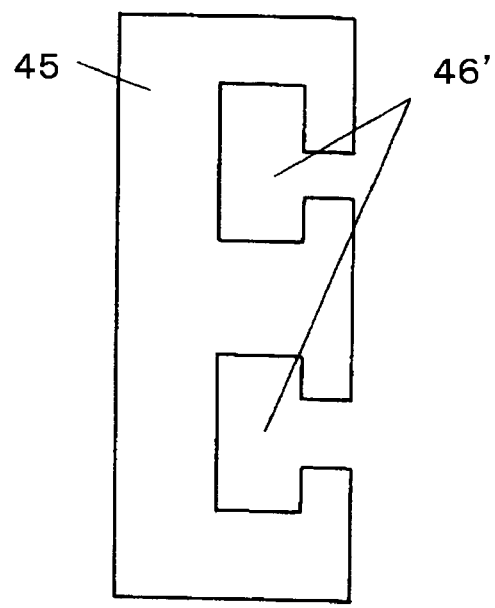
FIG. 10 is a partial sectional view of an inner yoke.
Figure 11:
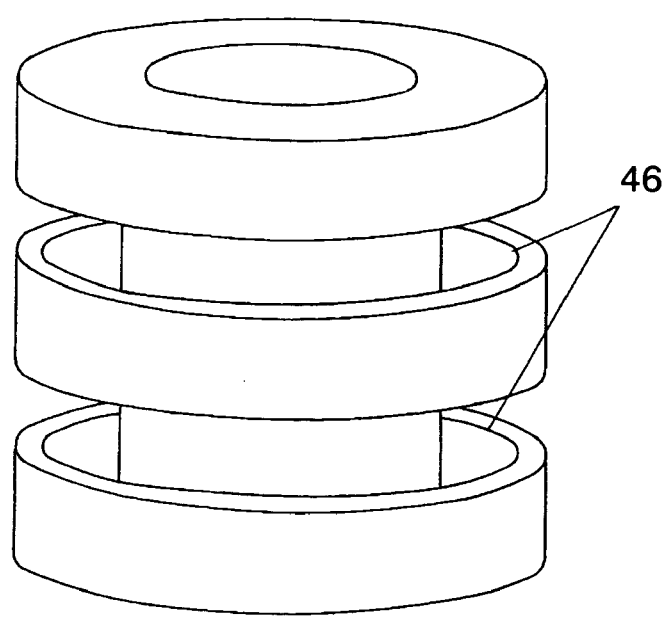
FIG. 11 shows an inner yoke in accordance with a third exemplary embodiment.

In the case of a stator having two coils, two slots 46 can be provided to magnetic sheet 45 as shown in FIG. 10. This magnetic sheet is laminated to form what is shown in FIG. 11, and two slots 46 are provided at an upper and a lower sections.

The magnetic sheet is punched out from electrical steel sheet, and its magnetic property depends on the magnetic property of the electrical steel sheet. Therefore, an electrical steel sheet with excellent magnetic property, to be more specific, less iron loss and higher magnetic flux density, is preferable. Non-oriented electrical steel sheet is generally used in motors. This steel plate has excellent magnetic property along every direction of the steel plate.

Since the magnetic flux of the iron core in the linear actuator of the present invention travels only along limited directions, i.e., axial direction and radial direction, so that an electrical steel sheet having excellent magnetic property in those two directions is acceptable.

The non-oriented electrical steel sheet has good magnetic property in any directions, in fact this good magnetic property is rather lower than the best direction magnetic property of an oriented electromagnetic plate to be used for transformers. Therefore, it is preferable to employ a double oriented electrical steel sheet having excellent magnetic property in specified two directions, i.e., rolling direction and the right-angle direction. Then the magnetic sheets are punched out from this steel plate such that the axial direction of the sheets agrees with the rolling direction of the steel plate. The magnetic sheets thus punched out are laminated to form an iron core of a stator, whereby the motor efficiency can improve by 2% higher than another motor that employs non-oriented electrical steel sheet.

Exemplary Embodiment 3

Figure 12:
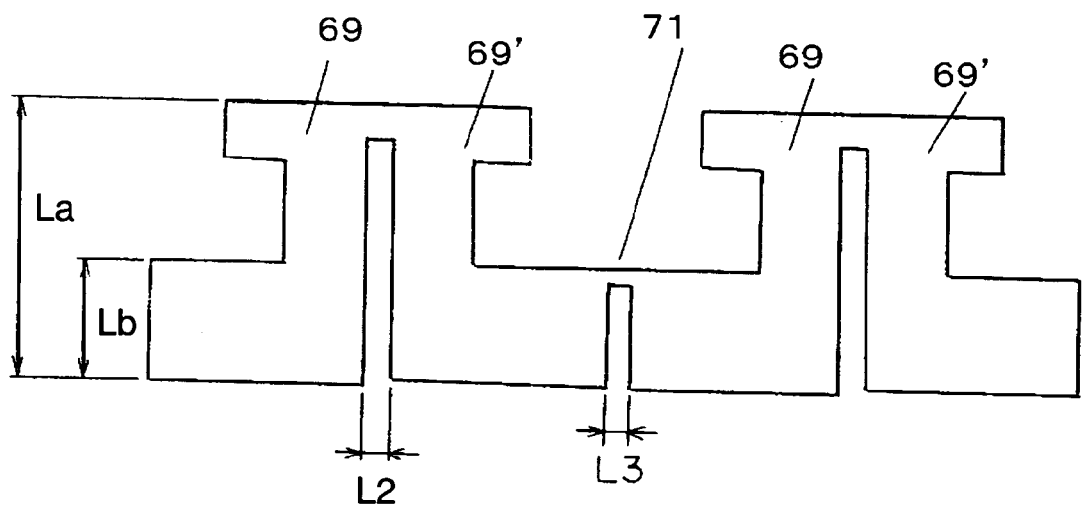
FIG. 12 shows a magnetic sheet in accordance with the third embodiment.
Figure 14:
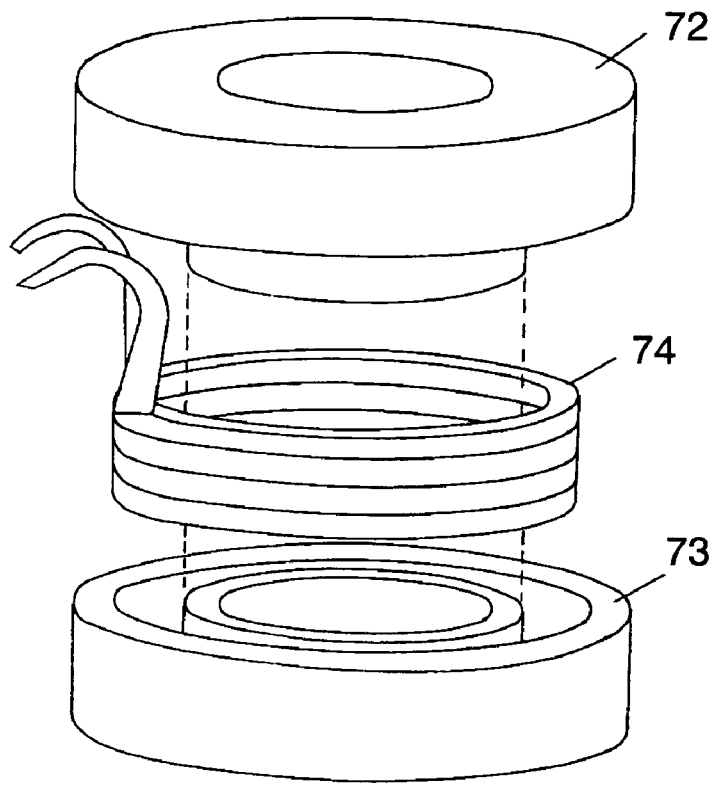
FIG. 14 illustrates that an inner yoke is divided.
Figure 15:
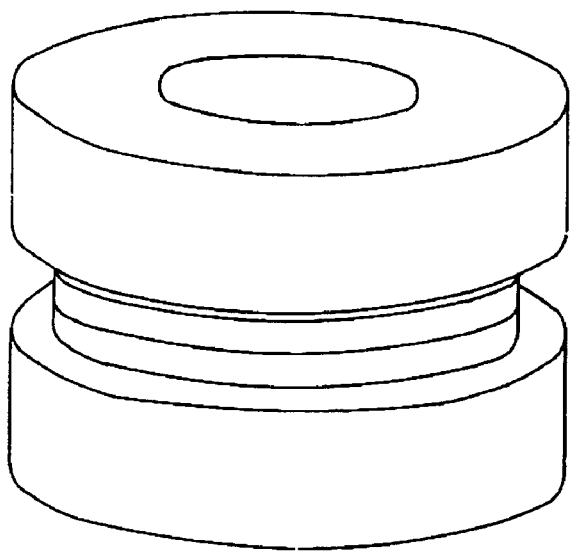
FIG. 15 shows an inner yoke.

FIG. 14 shows an inner yoke that is divided at a slot into two parts, i.e., an upper and a lower section. Magnetic sheets 74 divided are formed by the method described in the second embodiment. In this case, divided magnetic sheet 69 is punched out in the shape shown in FIG. 12 from electrical steel sheet. Interval L2 between magnetic sheets 69 and 69' is equal to space width L0 on outer wall of the iron core laminated radially.

Length L3 of coupler 71 between adjacent magnetic sheets is determined by dimensions La, Lb, the foregoing space width L0, and outer diameter Ld of the stator iron core. To be specific, the following equation determines L3.

$$L3 = L0/Ld \times (Ld - La + Lb)$$

Figure 13:
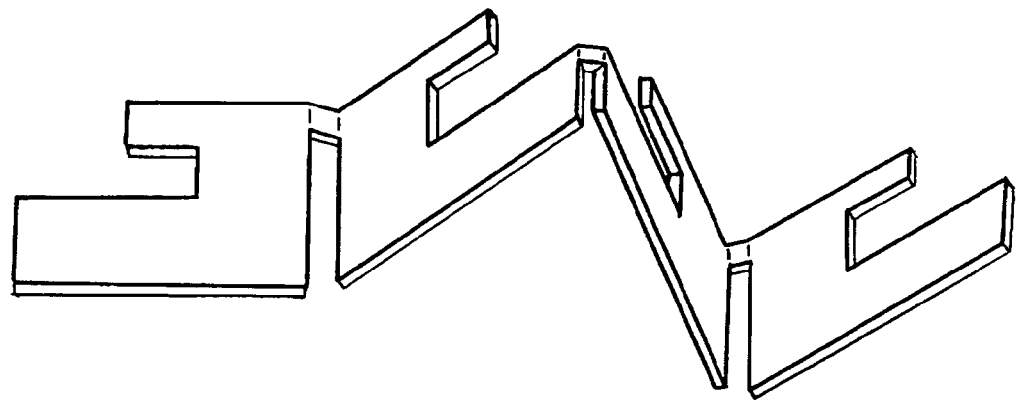
FIG. 13 shows a bent magnetic-sheet.

The magnetic sheet is folded over as shown in FIG. 13 similar to what is shown in the second embodiment, and laminated radially. Upper inner yoke 72 and lower inner yoke 73 thus divided are prepared respectively, and coil 74 to be wound on the iron core has been wound in solenoid type in advance and fixed as usual. Then as shown in FIG. 14, coil 74, upper inner yoke 72 and lower inner yoke 73 laminated independently are assembled. The assembled body is molded with resin compound, thereby completing an inner yoke.

Figure 16:
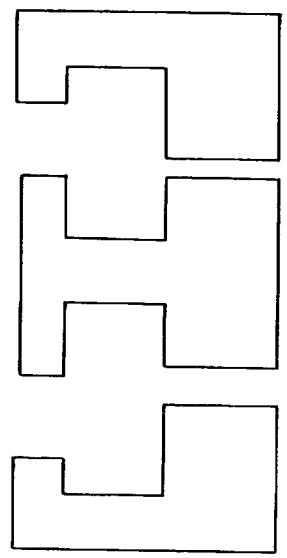
FIG. 16 shows a magnetic sheet split into two parts.
Figure 17:
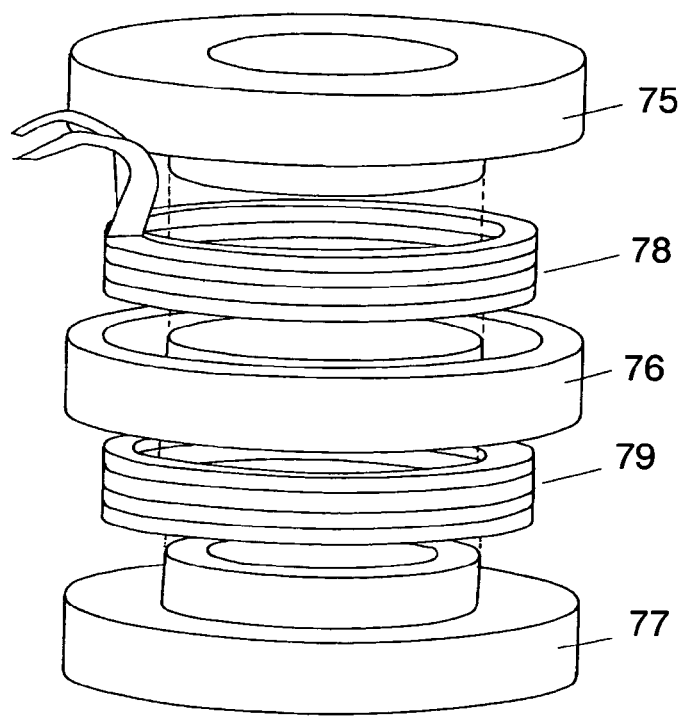
FIG. 17 shows an inner yoke split into two parts.

In the case of an inner yoke having two coils, a magnetic sheet is divided into three parts, i.e., an upper, middle and lower sections, as shown in FIG. 16. Upper inner yoke 75, middle inner yoke 76 and lower inner yoke 77 are independently formed. Then those upper inner yoke 75, middle inner yoke 76, lower inner yoke 77 and coils 88, 89 are assembled and molded with resin compound to obtain an inner yoke.

Exemplary Embodiment 4

Figure 18:
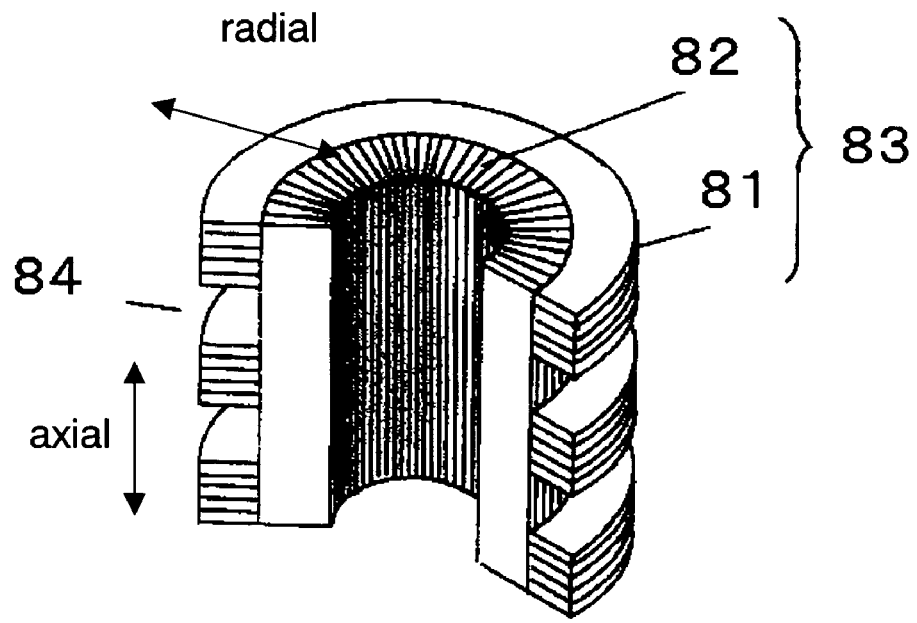
FIG. 18 is a partial sectional view of an inner yoke in accordance with a fourth exemplary embodiment.

As shown in FIG. 18, inner yoke 83 is formed of three teeth 81 and one yoke 82. Each one of teeth 81 is formed by punching out ring-shaped magnetic sheets and laminating the sheets axially to form an axial laminated body. Yoke unit 82 is formed by punching out rectangular magnetic sheets and arranging the sheets in circumference direction to form a cylindrical shape, namely, yoke unit 82 is a radial laminated body. The rectangular magnetic sheet is made from oriented electrical steel sheet, which has tendency of passing magnetic flux along the rolling direction. Due to this tendency the rolling direction of the steel plate is to agree with a vibrating direction of the vibrator in arranging the magnetic sheets along the circumference direction. Three teeth 81 are assembled such that inner face of teeth 81 fits to outer face of yoke unit 82, and three teeth 81 are spaced at equal intervals to reserve a space for coil's winding. Inner yoke 83 thus structured generates magnetic flux by passing electric current through the coil wound on a slot. The magnetic flux flows along the vibrating direction of the vibrator in yoke unit 82, and along radial direction in teeth 81. Therefore, in the case that foregoing inner yoke 83 structured above uses E-shaped or C-shaped magnetic sheets punched out from an oriented electrical steel sheet, either one of the vibrating or radial direction can use only a better magnetic property instead of a lower permeable magnetic property directed along right angles with respect to the rolling direction that tends to pass the magnetic flux.

Such a yoke structure is applicable not only to an inner yoke but also to an outer yoke.

Exemplary Embodiment 5

Figure 19:
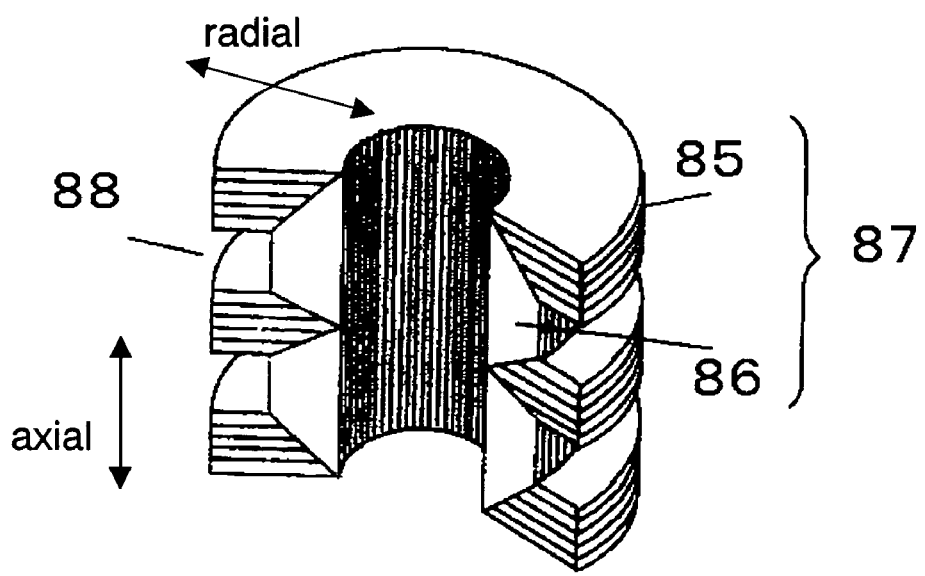
FIG. 19 is a partial sectional view of an inner yoke in accordance with a fifth exemplary embodiment.

As shown in FIG. 19, inner yoke 87 includes three teeth 83 of which inner wall tilts with respect to the vibrating direction of the vibrator, and outer wall of yoke unit 86 also tilts with respect to the vibrating direction. Teeth 85 are formed by punching out magnetic sheet to form a ring shape along the axial direction and laminating the ring-shaped magnetic sheets axially to form an axial laminated body. Yoke unit 86 is formed by punching out rectangular magnetic sheets and laminating the sheets in circumference direction to form a cylindrical shape, namely, yoke unit 86 is a radial laminated body. The rectangular magnetic sheet is made from oriented electrical steel sheet, which has tendency of passing magnetic flux along the rolling direction. Due to this tendency the rolling direction of the steel plate is to agree with a vibrating direction of the vibrator in arranging the magnetic sheets along the circumference direction. Three teeth 85 are assembled such that inner wall of teeth 85 fits to outer wall of yoke unit 86. This fitting requires the tilted faces described above because the faces can be fitted to each other due to those tilts. The combination of yoke unit 86 and teeth 85, both having tilting faces, allows the flow of magnetic flux generated from the coil wound on slot 88 to reduce as much as possible the magnetic flux flowing along right angle directions with respect to the rolling direction. Because the magnetic flux of oriented electrical steel sheet is hard to flow along the rolling direction. As a result, the magnetic flux generated can be more efficiently used.

Exemplary Embodiment 6

Figure 20:
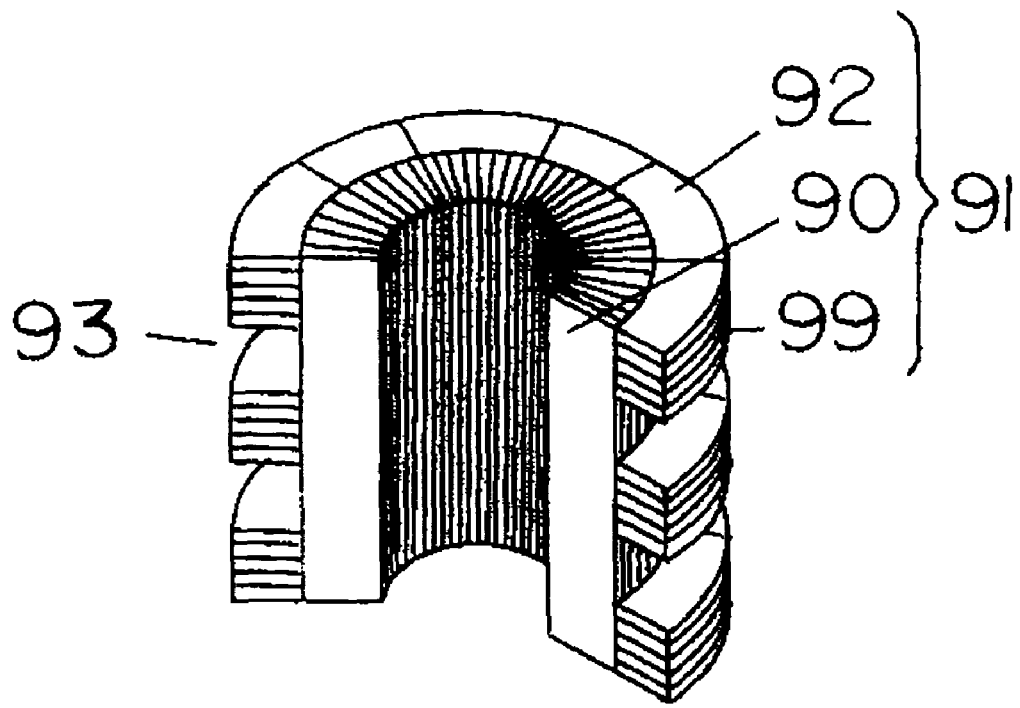
FIG. 20 is a partial sectional view of an inner yoke in accordance with a sixth exemplary embodiment.

As shown in FIG. 20, inner yoke 91 is formed of three teeth 99 and one yoke unit 90. Three teeth 99 are made from oriented electrical steel sheet which is punched out into a fan shape. The fan shape is directed such that the magnetic flux tends to flow along the radial direction, namely the rolling direction. Teeth block 92 laminated in the vibrating direction of the vibrator are combined into a ring shape to form teeth 99. Yoke unit 90 is formed by punching out rectangular magnetic sheets and laminating the sheets in circumference direction to form a cylindrical shape, namely, yoke unit 90 is a radial laminated body. The rectangular magnetic sheet is made from oriented electrical steel sheet, which has tendency of passing magnetic flux along the rolling direction. Due to this tendency the rolling direction of the steel plate is to agree with vibrating direction of the vibrator in arranging the magnetic sheets along the circumference direction. As discussed above, the entire inner yoke 91 is formed of oriented electrical steel sheet, so that the magnetic flux generated from the coil wound on slot 93 flows along the direction of the better magnetic property of the oriented electrical steel sheet. As a result, the magnetic flux can be used efficiently.

Exemplary Embodiment 7

Figure 21:
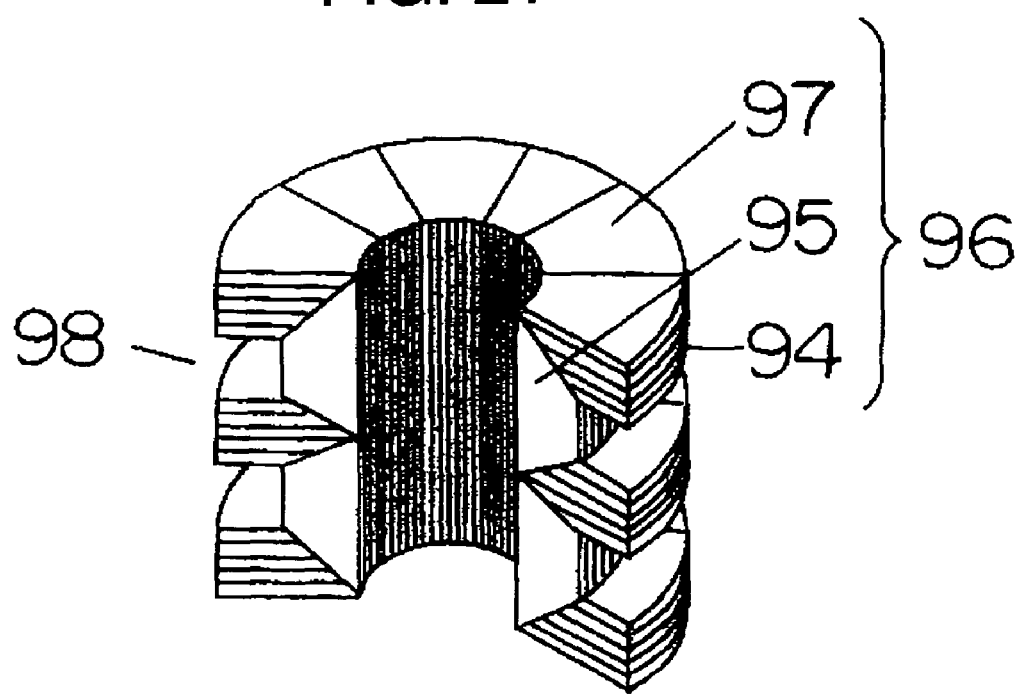
FIG. 21 is a partial sectional view of an inner yoke in accordance with a seventh exemplary embodiment.

As shown in FIG. 21, inner yoke 96 comprises the following elements:

three teeth 94 of which inner wall tilts with respect to vibrating direction of the vibrator; and yoke unit 95 of which outer wall also tilts with respect to the vibrating direction.

Teeth 94 are made from oriented electrical steel sheet which is punched out into a fan shape. The fan shape is directed such that the magnetic flux tends to flow along the radial direction, namely the rolling direction. Teeth block 97 laminated in the vibrating direction of the vibrator are combined into a ring shape to form teeth 94. Yoke unit 95 is formed by punching out rectangular magnetic sheets and laminating the sheets in circumference direction to form a cylindrical shape, namely, yoke unit 95 is a radial laminated body. The rectangular magnetic sheet is made from oriented electrical steel sheet, which has tendency of passing magnetic flux along the rolling direction. Due to this tendency the rolling direction of the steel plate is to agree with vibrating direction of the vibrator in arranging the magnetic sheets along the circumference direction. Three teeth 94 are assembled such that inner wall of teeth 94 fits to outer wall of yoke unit 95. This fitting requires the tilted faces described above because the faces can be fitted to each other due to those tilts. The combination of yoke unit 95 and teeth 94, both having tilting faces, allows the flow of magnetic flux generated from the coil wound on slot 98 to reduce as much as possible magnetic flux flowing along right angle directions with respect to the rolling direction. Because the magnetic flux of oriented electrical steel sheet is hard to flow along the rolling direction. As a result, the magnetic flux generated can be more efficiently used.

Exemplary Embodiment 8

Figure 22:
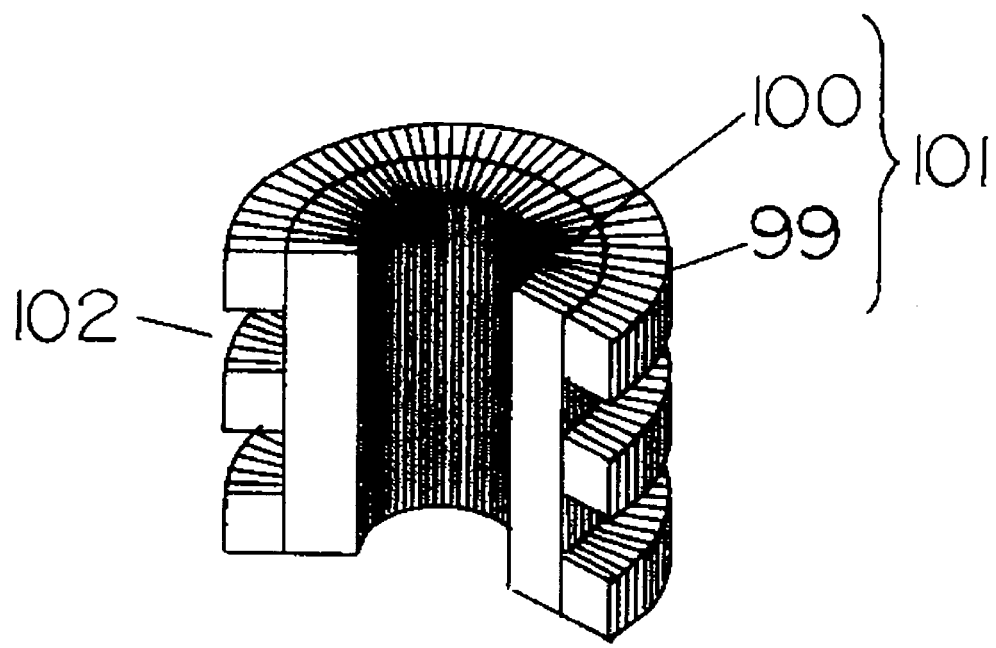
FIG. 22 is a partial sectional view of an inner yoke in accordance with a eighth exemplary embodiment.

As shown in FIG. 22, inner yoke 101 is formed of three teeth 99 and one yoke unit 100. Teeth 99 are formed by punching out rectangular magnetic sheets and arranging the sheets in circumference direction to form a cylindrical shape, namely, teeth 99 are radial laminated bodies. The rectangular magnetic sheet is made from oriented electrical steel sheet, which has tendency of passing magnetic flux along the rolling direction. Due to this tendency the rolling direction of the steel plate is to agree with vibrating direction of the vibrator in arranging the magnetic sheets along the circumference direction. Yoke unit 100 is formed by punching out rectangular magnetic sheets and arranging the sheets in circumference direction to form a cylindrical shape, namely, yoke unit 100 is a radial laminated body. The rectangular magnetic sheet is made from oriented electrical steel sheet, which has tendency of passing magnetic flux along the rolling direction. Due to this tendency the rolling direction of the steel plate is to agree with the vibrating direction of the vibrator in arranging the magnetic sheets along the circumference direction. Three teeth 99 are assembled such that inner wall of teeth 99 fits to outer wall of yoke unit 100, and the three teeth are spaced at equal intervals to reserve spaces for coils' windings. Inner yoke 101 thus structured generates magnetic flux by passing electric current through the coil wound on slot 102. The magnetic flux flows along the vibrating direction of the vibrator in the yoke unit, and along radial direction in the teeth. Therefore, in the case that foregoing inner yoke 101 structured above uses E-shaped or C-shaped magnetic sheets punched out from an oriented electrical steel sheet, either one of the axial or radial direction can use only a better magnetic property instead of a lower permeable magnetic property directed along right angles with respect to the rolling direction that tends to pass the magnetic flux.

Figure 23:
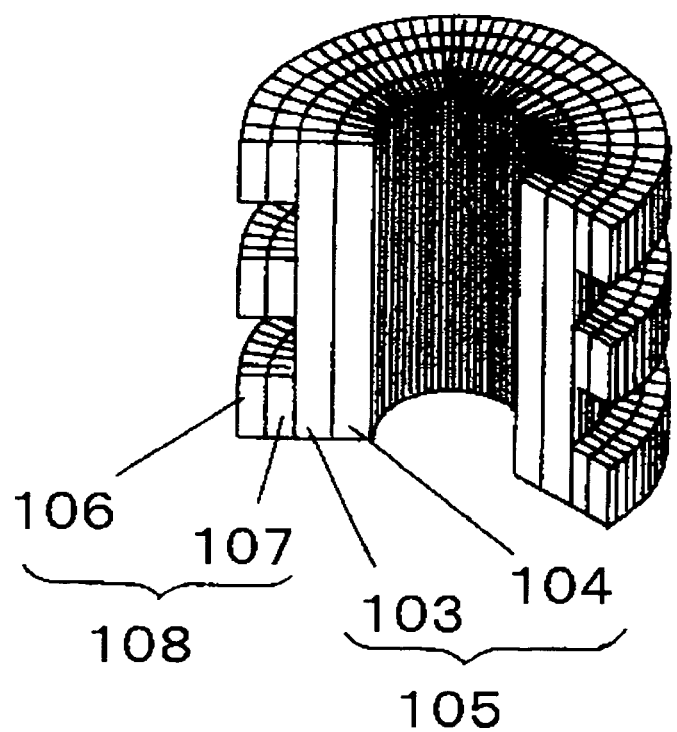
FIG. 23 is a partial sectional view of an inner yoke in accordance with a ninth exemplary embodiment.

Inner yoke 101 is divided into yoke unit 100 and teeth 99, thereby obtaining a greater space factor of the vibrator than the case where the yoke is formed by integrating E-shaped or C-shaped vibrator. Further as shown in FIG. 23, yoke unit 105 is divided into inside yoke section 104 and outside yoke section 103 along the vibrating direction of the vibrator, or teeth 108 are divided into inside teeth section 107 and outside teeth section 106 along the vibrating direction, thereby further increasing the space factor of the vibrator.

Exemplary Embodiment 9

Figure 24:
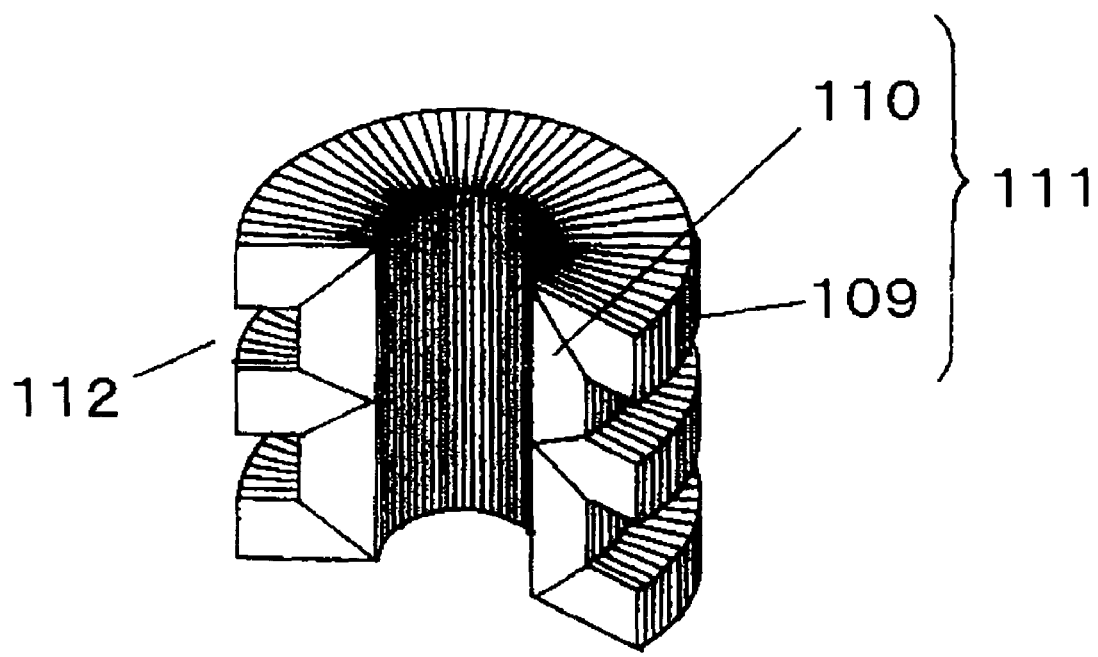
FIG. 24 is a partial sectional view of an inner yoke in accordance with a tenth exemplary embodiment.

As shown in FIG. 24, yoke unit 110 of inner yoke 111 includes three teeth 109 of which inner wall tilts with respect to vibrating direction of the vibrator, and outer wall of yoke unit 120 also tilts with respect to the vibrating direction. Magnetic sheets forming teeth 109 are punched out such that the outer wall of teeth 109 is parallel to the vibrating direction and the inner wall tilts with respect to the vibrating direction because the inner wall fits to yoke unit 110. The magnetic sheets thus punched out are arranged in circumference direction, namely, teeth 109 are radial laminated bodies. Magnetic sheets forming yoke unit 110 are punched out such that the inner wall of yoke unit 110 is parallel to the vibrating direction and the outer wall tilts with respect to the vibrating direction because the outer wall fits to teeth 109. The magnetic sheets thus punched out are arranged in circumference direction, namely, yoke unit 110 is radial laminated body. The magnetic sheets discussed above are made from oriented electrical steel sheet, which has tendency of passing magnetic flux along the rolling direction. Due to this tendency, the rolling direction of the steel plate used in yoke unit 110 is to agree with the vibrating direction, and the rolling direction of the steel plate used in teeth 109 is directed to the radial direction. The combination of yoke unit 110 and teeth 109, both having tilting faces, allows the flow of magnetic flux generated from the coil wound on slot 122 to reduce as much as possible the magnetic flux flowing across the direction along which the magnetic flux of oriented electrical steel sheet is hard to flow. As a result, the magnetic field generated can be more efficiently used.

Exemplary Embodiment 10

Figure 25:
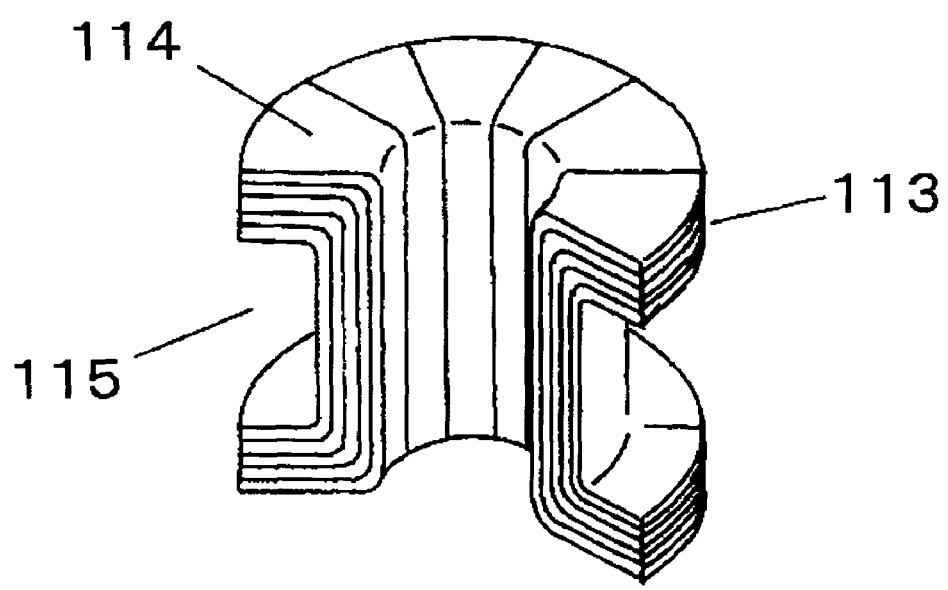
FIG. 25 is a partial sectional view of an inner yoke in accordance with a eleventh exemplary embodiment.
Figure 26:
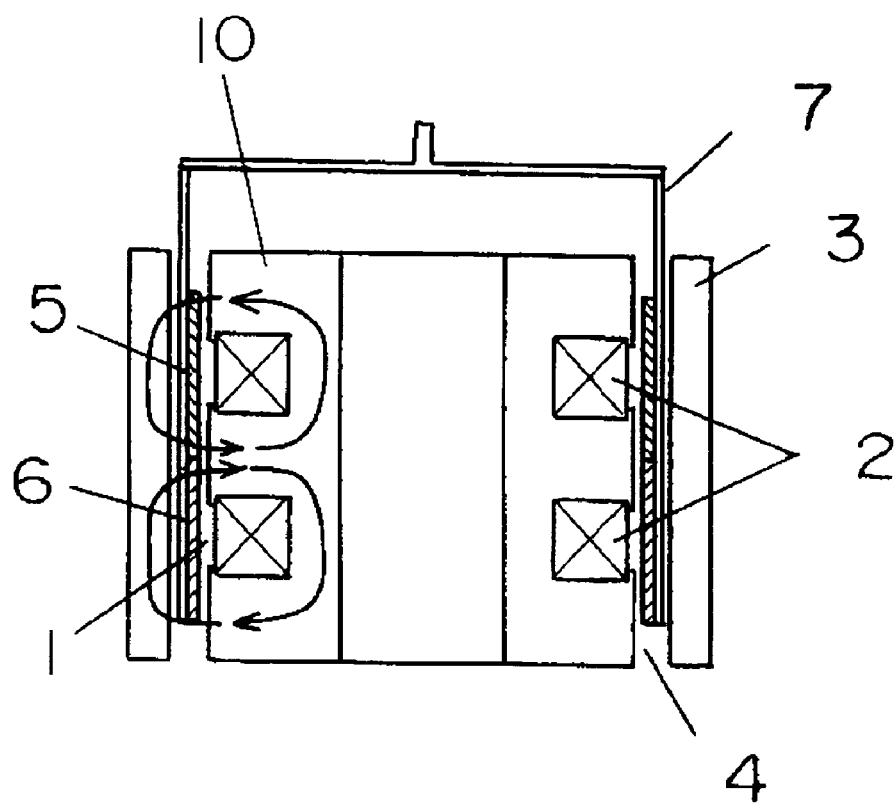
FIG. 26(a) is a sectional view of a conventional linear actuator.
FIG. 26(b) is a partial sectional view of an inner yoke of the conventional linear actuator.
Figure 26:
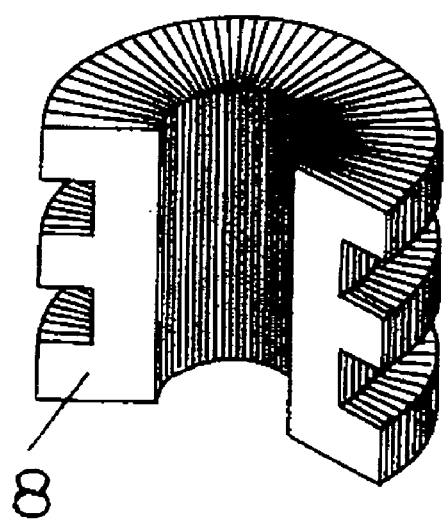

As shown in FIG. 25, inner yoke 113 is formed of core blocks 114. Each one of the blocks is formed by stacking rectangular magnetic sheets punched out to form a laminated body. Both the ends of the laminated body are bent by 90 degrees with respect to the laminating direction to form teeth. Core blocks 114 are arranged in circumference direction to form a cylindrical shape, so that inner yoke 113 is completed. The rectangular magnetic sheet is made from oriented electrical steel sheet, which has tendency of passing magnetic flux along the rolling direction. Due to this tendency the rolling direction of the steel plate is to agree with vibrating direction of the vibrator in forming the laminated body. In this inner yoke 113 thus structured, magnetic flux generated by feeding the coil wound on slot 115 with electric current flows along the thickness direction of the oriented electrical steel sheet. Thus the magnetic-flux easy-to-flow direction of the oriented electrical steel sheet agrees with the laminated direction. As a result, the magnetic flux can flow efficiently.

INDUSTRIAL APPLICABILITY

A laminated core to be used in a linear actuator is provided. The present invention allows assembling the laminated core with ease.

The invention claimed is:

1. A cylindrically shaped laminated core having a plurality of adjacent laminated magnetic sheets forming the cylindrically shaped laminated core, said laminated core comprising:

a plurality of couplers for attaching said magnetic sheets to each other, said plurality of couplers situated along ends of said magnetic sheets which are situated along an outer circumference of said core;

said magnetic sheets attached to each other by said couplers at alternately only an upper portion or a lower portion of said ends to form a zig-zag pattern.

2. The laminated core of claim 1, wherein the couplers are welded places which couple the magnetic sheets adjacent to each other.

3. The laminated core of claim 1, wherein the couplers are caulked places which couple the magnetic sheets adjacent to each other.

4. The laminated core of claim 1, wherein another coupler is provided along an inner circumference of said core.

5. The laminated core of claim 1, wherein the magnetic sheets are flat and each one of the sheets has a uniform thickness across each one of the sheets.

6. A laminated core formed by laminating a plurality of magnetic sheets in circumference direction to form a cylindrical shape; said magnetic sheets attached to each other at alternately only an upper portion or a lower portion to form a zig-zag pattern, said magnetic sheets attached to each other by a plurality of couplers situated along ends of said magnetic sheets which are situated along an outer circumference of said core.

7. The laminated core of claim 6, wherein the magnetic sheets and the couplers are unitarily formed and unitarily punched out from an identical steel plate.

8. The laminated core of claim 7, wherein each one of the magnetic sheets is punched out from the steel plate such that longitudinal direction of each one of the magnetic sheets agrees with rolling direction of the steel plate.

9. The laminated core of claim 7, wherein the magnetic sheets are made from double oriented electrical steel sheet.

10. The laminated core of claim 9, wherein longitudinal direction of each one of the magnetic sheets agrees with rolling direction of the double oriented electrical steel sheet.

11. The laminated core of claim 6, wherein an interval between the adjacent magnetic sheets in circumference direction is equal to a length of one of the couplers.

12. The laminated core of claim 8, wherein the laminated core is divided axially.

13. The laminated core of claim 8, wherein the core is molded with resin compound that includes magnetic powder.

14. The laminated core of claim 13, wherein the resin compound includes the magnetic powder not less than 50 volume %.

15. The laminated core of claim 14, wherein the magnetic powder is iron powder.

16. The laminated core of claim 8, further comprising:
a radial laminated body formed by laminating the magnetic sheets in circumference direction,
wherein said magnetic sheets form an axial laminated body.

17. The laminated core of claim 16, wherein the radial laminated body is made from oriented electrical steel sheet of which easy-to-flow direction for magnetic flux of the steel plate agrees with the axial direction of the laminated core.

18. The laminated core of claim 16, wherein the axial laminated body is made from oriented electrical steel sheet of which easy-to-flow direction for magnetic flux of the steel plate agrees with radial direction of the core.

19. The laminated core of claim 16, wherein the axial laminated body is divided into a plurality of pieces in the circumference direction.

20. A cylindrically shaped laminated core of claim 1, wherein further adjacent magnetic sheets are attached together at a common end of said upper end or said lower end.

21. A laminated core of claim 6, wherein further adjacent magnetic sheets are attached together at a common end of said upper end or said lower end.

22. A laminated core of claim 12, wherein further adjacent magnetic sheets are attached together at a common end of said upper end or said lower end.

23. A laminated core of claim 13, wherein further adjacent magnetic sheets are attached together at a common end of said upper end or said lower end.

24. A laminated core of claim 16, wherein further adjacent magnetic sheets are attached together at a common end of said upper end or said lower end.

25. A linear actuator comprising:
a cylindrical outer yoke;
an inner yoke disposed inside the outer yoke via a space;
a vibrator having a permanent magnet and vibrating in the space; and
a coil disposed in a slot provided to one of the outer yoke and the inner yoke,
wherein one of the outer yoke and the inner yoke is a laminated core formed by laminating a plurality of magnetic sheets in circumference direction to form a cylindrical shape; the laminated core including:
a plurality of couplers provided to the magnetic sheets;
wherein the couplers are provided so that said magnetic sheets are attached to each other at alternately only an upper portion or a lower portion to form a zig-zag pattern, said magnetic sheets attached to each other by said plurality of couplers which are situated along an outer circumference of said core.

26. A compressor using a linear actuator as a power source, the actuator comprising:
a cylindrical outer yoke;
an inner yoke disposed inside the outer yoke via a space;
a vibrator having a permanent magnet and vibrating in the space; and
a coil disposed in a slot provided to one of the outer yoke and the inner yoke,
wherein one of the outer yoke and the inner yoke is a laminated core formed by laminating a plurality of magnetic sheets in circumference direction to form a cylindrical shape; the laminated core including:
a plurality of couplers provided to the magnetic sheets;
wherein the couplers are provided so that said magnetic sheets are attached to each other at alternately only an upper portion or a lower portion to form a zig-zag pattern, said magnetic sheets attached to each other by said plurality of couplers which are situated along an outer circumference of said core.

27. A linear actuator of claim 25, wherein further adjacent magnetic sheets are attached together at a common end of said upper end or said lower end.

28. A compressor of claim 26, wherein further adjacent magnetic sheets are attached together at a common end of said upper end or said lower end.

* * * * *

UNITED STATES PATENT AND TRADEMARK OFFICE
CERTIFICATE OF CORRECTION

| | |
|---|---|
| PATENT NO. | : 7,049,925 B2 |
| APPLICATION NO. | : 10/380895 |
| DATED | : May 23, 2006 |
| INVENTOR(S) | : Shinichiro Kawano et al. |

It is certified that error appears in the above-identified patent and that said Letters Patent is hereby corrected as shown below:

Column 11
Line 42, change "8" to -- 6 --

Column 11
Line 44, change "8" to -- 6 --

Column 11
Line 52, change "8" to -- 6 --

Signed and Sealed this

Thirty-first Day of October, 2006

JON W. DUDAS
*Director of the United States Patent and Trademark Office*